United States Patent [19]

Butler et al.

[11] 4,246,242

[45] Jan. 20, 1981

[54] METHOD OF REMOVING GASEOUS POLLUTANTS FROM FLUE GAS

[75] Inventors: Charles H. S. Butler, Horseheads; Patrick J. McGauley, Port Washington, both of N.Y.

[73] Assignee: Corning Glass Works, Corning, N.Y.

[21] Appl. No.: 962,410

[22] Filed: Nov. 20, 1978

Related U.S. Application Data

[63] Continuation of Ser. No. 756,840, Jan. 5, 1977, abandoned.

[51] Int. Cl.³ .............................................. B01D 53/34
[52] U.S. Cl. .................................... 423/210; 423/235; 423/240; 423/242; 159/4 A; 159/4 S; 159/48 R; 261/89
[58] Field of Search ............... 423/210, 240 R, 240 S, 423/242 R, 242 S, 215.5, 235; 159/4 D, 4 S, 48 R; 261/89

[56] References Cited

U.S. PATENT DOCUMENTS

| | | | |
|---|---|---|---|
| 1,221,505 | 4/1917 | Bradley et al. | 423/215.5 X |
| 1,830,174 | 11/1931 | Peebles | 159/48 R |
| 2,231,309 | 2/1941 | Weber | 423/215.5 X |
| 3,635,665 | 1/1972 | Mattern | 423/215.5 X |
| 3,785,111 | 1/1974 | McIlvaine | 55/7 |
| 3,895,994 | 7/1975 | Saguchi et al. | 159/48 R |
| 3,969,482 | 7/1976 | Teller | 423/215.5 X |
| 3,995,005 | 11/1976 | Teller | 423/240 R X |

*Primary Examiner*—Earl C. Thomas
*Attorney, Agent, or Firm*—Burton R. Turner; Clarence R. Patty, Jr.; Michael de Angeli

[57] ABSTRACT

A spray dryer apparatus is used to bring a water solution or slurry of finely-divided, basic reactant into intimate contact with a flue gas bearing acidic gases or vapors. The basic material reacts with the acids in the flue gas to form a particulate precipitate, while the water from the solution or slurry is fully evaporated in the gas stream. Conventional means are then utilized to remove the particulate reaction product from the flowing gas stream.

6 Claims, 1 Drawing Figure

U.S. Patent
Jan. 20, 1981
4,246,242
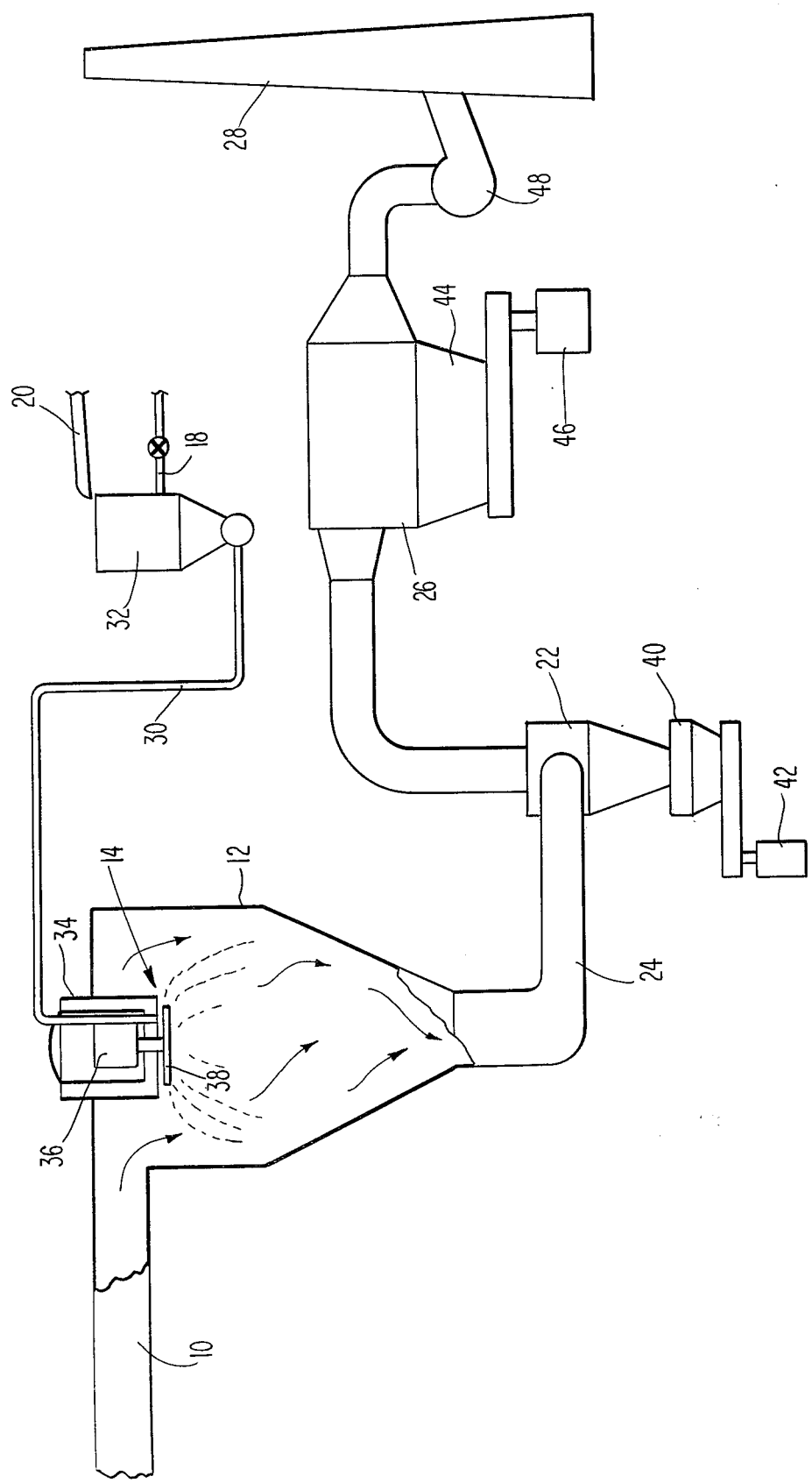

METHOD OF REMOVING GASEOUS POLLUTANTS FROM FLUE GAS

This is a continuation of application Ser. No. 756,840, filed Jan. 5, 1977, and now abandoned.

BACKGROUND OF THE INVENTION

This invention relates to a system for removing pollutants from a flue gas, and more particularly to a method for forming and then removing particulate matter from a relatively dry flue gas stream.

Many industrial or commercial facilities generate and discharge hot streams of flue gas to the atmosphere. The flue gas often includes entrained solids, along with pollutants in the form of gases, mists and vapors. These pollutants must be removed before discharging the flue gas into the atmosphere, in order to prevent atmospheric pollution. Further, in many instances certain of the impurities found in the flue gas may be sufficiently valuable so as to justify their recovery.

Many diverse types of purification apparatus and methods are known in the prior art. These approaches may generally be categorized as either "wet" or "dry" methods. With dry methods, particulate matter in a flue gas stream is removed by physical separation. This is ordinarily effected through the use of filters, electrostatic precipitators, or centrifugal separators such as cyclones. While dry methods of separation have several desirable attributes, it will be recognized that they have no utility in removing vapors or gaseous contaminants from the flue gas stream.

Wet separation methods, on the other hand, can be used to remove various gaseous and vaporous impurities, as well as solid materials, from the flue gas. In particular, where acidic gaseous or vaporous impurities are present it is known to bring the flue gas into intimate contact with a basic solution or slurry (also termed a liquor).

The liquor is usually constituted of a water slurry bearing a basic reactant such as crushed limestone. By vigorously intermixing the vapor-bearing flue gas and the scrubbing liquor it is possible to react the scrubbing material with the acidic impurity to produce a neutral product. As the product is formed it is automatically carried from the flue gas stream by the entraining liquid of the slurry, hence the term "washing".

One example of a system of the latter type is U.S. Pat. No. 3,785,119—McIlvaine. McIlvaine teaches that solid, particulate material in a flue gas may be removed by a conventional dry separation stage. A wet scrubber absorber is then used to treat a fractional portion of the flue gas to allow a gaseous impurity (i.e., sulfur dioxide) to be absorbed directly into a water slurry of limestone. The wet, sloppy precipitate which is then formed is transferred from the presence of the gas. The washing or scrubbing is produced by a spray of finely-divided slurry discharged counter to the flow of flue gas, collecting at the bottom of the scrubber housing from whence it is pumped to a holding tank. The washing of hot flue gases with wet precipitates in conventional processes saturates the flue gas with water and produces a wet, pasty mass which cakes the surrounding surfaces of the ducting and flue gas processing apparatus. Still further, the composition of the caked slurry is such as to attach ordinary mild steel, galvanized surfaces and the like so that the portions of the ducting and the processing apparatus which come in contact with the flue gas must be formed of stainless steel, rubber-lined steel or similar expensive corrosion-resistant material. To avoid these plugging difficulties many systems employ "two stage" scrubbing using sodium solutions (NaOH or $Na_2CO_3$) in the scrubber and then employing a second reaction in a liquid waste treatment plant, exchanging calcium from lime or the sodium used in the first step. This system is quite expensive.

Another deficiency of prior art methods of washing or scrubbing flue gases is that the resulting slurry is relatively difficult to handle. The particulate-bearing slurry is collected at an appropriate point in the processing system, in a sump or the like. The wet, sloppy mass must then be pumped to a remote site for disposition, or to a settling tank followed by a vacuum filter or centrifuge or the like where water and/or divided material from the slurry are separated and treated for recycling. Accordingly, it will be recognized that it would be highly advantageous to provide an improved system for removing vaporous and gaseous contaminants from a flue gas stream without the production of a wet, sloppy precipitate including a reaction product.

It is therefore an object of the present invention to provide an improved method for treating flue gases.

It is another object to provide a method for removal of vaporous or gaseous contaminants from a flue gas.

Yet another object is to provide an improved method for removing acidic contaminants from an industrial flue gas.

SUMMARY OF THE INVENTION

Briefly stated, in accordance with one aspect of the invention the foregoing objects are achieved by providing apparatus similar to a spray dryer for receiving a flue gas containing acidic contaminants. A water slurry of finely divided, basic reactant is prepared, and introduced into the flue gas in atomized form so as to completely evaporate the water of the slurry and to produce a reaction between the basic material and the acidic impurities to form discrete particles, comprising reaction products, in the flue gas stream. The particulate reaction products may thereafter be removed from the flue gas by conventional dry separation techniques.

In a preferred embodiment, the atomized slurry is introduced into the flue gas stream by means of a rotary disc, and directed so that a separation is maintained between the slurry-carrying flue gas and the walls of the vessel to further inhibit buildup of material on the vessel walls.

BRIEF DESCRIPTION OF THE DRAWING

While the specification concludes with claims particularly pointing out and distinctly claiming the subject matter which is regarded as the invention, it is believed that the invention will be better understood from the following description of a preferred embodiment taken in conjunction with the accompanying drawing in which one system for carrying out the present method is depicted in schematic form.

DESCRIPTION OF A PREFERRED EMBODIMENT

Flue gas from a furnace or the like (not shown) is directed through an inlet duct 10 to a vessel 12 in which various constituents of the flue gases are to be reacted. The vessel 12 is provided with atomization means 14, such as one or more spray heads, or alternatively a spinning disc atomizer. While both spray and disc-type atomization are considered to be adaptable for use with the present invention, a successfully-tested embodiment made use of a spinning disc atomizer. It has been found that a disc-type atomizer will operate over a wider range of slurry concentrations and volume, producing consistent particle size without plugging. The atomization mechanism, taken with the vessel in which it is enclosed, comprises a system not unlike a spray dryer. In fact, a successfully tested system utilized a modified spray dryer of the type manufactured by Bowen Engineering, Inc. of North Branch, New Jersey.

As is well known to those skilled in the art spray dryers generally comprise vessels or envelopes which are configured to provide an environment conducive to the rapid drying of a solution or slurry, which is introduced into the vessel in finely divided form. Such apparatus are widely used for producing powdered or finely-divided materials from a solution or slurry. This is accomplished by atomizing the liquid or slurry, then intermixing it with a system of hot gas so that the volatile constituent of the liquid (commonly water) is evaporated and the dissolved or slurried constitutents reduced to a fine, dry powder. The characteristics of the powdered product which is thus obtained can be controlled so that the properties may be varied to suit a particular application. Accordingly, spray drying has been used for drying and congealing drugs, processing detergent powders, producing ceramic powders, and preparing highly soluble powders for food products such as instant coffee.

The present inventors have found that spray drying apparatus and methodology can be adapted for use in removing objectionable materials from industrial flue gases. Accordingly, a slurry is prepared in slurrying vessel 32 by introducing water through a valved line 18, along with an appropriate, dry material through chute 20. While the specific material selected will depend upon process parameters and also upon the impurity to be removed from the flue gas, lime ($CaCO_3$), calcium hydroxide ($CaOH$), soda ash ($Na_2CO_3$), sodium carbonate ($Na_2HCO_3$), or caustic soda ($NaOH$) can all be used to advantage.

A first separator 22 is coupled to the outlet of vessel 12 by means of an appropriate duct 24 or the like. As depicted, a cyclone is preferred for intial particle removal. A cyclone may not always be required, its presence being dependent upon the degree of duct loading. The outlet of the cyclone is conducted to a second separator 26, shown as a bag house or cloth filter. Alternatively, an electrostatic precipitator may be used for the final removal of particles not previously separated from the gas flow. The cleaned flue gas then exits from a stack 28 and can safely be dissipated in the atmosphere.

Operation of the system of the Figure will now be described in detail, making particular reference to the specific elements enumerated therein. The hot flue gases from a furnace or similar industrial or commercial system are first conducted to vessel 12, wherein they are to be reacted with an appropriate, slurried material. The hot stack gases are conventionally at temperatures of from 600° to 1200° F., and often contain both particulate and gaseous (or vaporous) contaminants. Commercial plants using fossil fuels to produce lime, cement, metals, glass, ceramics, or to produce electric power engender a wide variety of objectionable contaminants. It has been found that many of the contaminating chemicals, and particularly oxides or sulfur and certain acids, are chemically reactive with water vapor and with certain water-soluble materials. When the gases are cooled the contaminating chemicals, or their reaction products, evolve into finely divided particles and/or sticky semi-liquid drops or particles. Still further, many of the gaseous or vaporous materials found in flue gases are highly corrosive and will combine with water vapor to form compounds such as sulfuric, hydrofluoric, hydrochloric and nitric acids.

The purpose of vessel 12, along with atomization means 14, is to bring a dissolved or slurried reactant into intimate contact with the flue gas contaminants. Accordingly, a reactant (conveniently a basic material as listed above) is prepared in a water solution or slurry and pumped through a pipe 30 by a variable speed pump from vessel 32 to atomizing head 14. By providing a second duct 34 ambient, relatively cold, air can be bled downwardly about the atomization region to prevent the premature drying of the slurry, and thus protect against scaling and corrosion.

In the illustrated embodiment the cold air bleed passage takes the form of an annular duct surrounding a drive motor 36. Coupled to the shaft of the drive motor is an atomizing disc 38 which spins at a high rate of speed. Slurry from pipe 30 impinges upon the rear surface of the disc and is thrown outward by centrifugal force, breaking into fine droplets as it leaves the periphery of the disc.

The atomized slurry is introduced concurrently with the flow of hot flue gases. In the preferred embodiment the flue gases are directed downwardly, as shown. In this manner the atomized slurry is caused to flow directly downwardly with a minimum of swirling, agitation or counterflow which would tend to bring the wet slurry into contact with the sides of vessel 12. Further, by properly orienting the spray heads or atomizing discs the atomized slurry can be directed in such a manner as to cause its rapid entrainment into the downwardly-moving flue gases, and prevent the liquor from being thrown outwardly against the walls of the vessel and maintain a finite separation between the liquor and the vessel walls. If desired, appropriate baffles can be installed to cause the incoming gas to swirl, spiral-fashion, about the atomization head in order to increase the residence time of the flue gas.

While the correct density of the slurry to be atomized can easily be determined in practice, it is usually desirable to add slightly more than the stoichiometric quantity for the desired reaction. However, in some applications in order to enhance economy of operation or to obtain an end product with a consistent proportion of entrained impurities less than stoichiometric amounts can be used. At the same time, it is ordinarily desirable to add as little water as possible inasmuch as with the present method it is necessary that all of the slurry water can be completely evaporated. As a consequence the gases leaving the spray dryer are not saturated with water, but conversely are significantly above their dew point. In this manner a relatively dry gas is exhausted from vessel 12. More important to the present invention, however, is the fact that the particulate reaction products are sufficiently dry to be treated as solids.

Due to the reaction between the gaseous or vaporous acids in the flue gases, and the reactant introduced by the atomizing heads, a volume of particulate material is then created within the vessel 12. For example, where fluorine is present in the exhaust gases and a water slurry containing either calcium hydroxide or sodium carbonate is added, the following respective reactions will occur:

$$2HF + Ca(OH)_2 = CaF_2 + 2H_2O$$

$$2HF + Na_2CO_3 = 2NaF + H_2O + CO_2$$

In another example, sulfur trioxide is present in the flue gases, and calcium hydroxide or sodium carbonate is used in the reacting slurry, producing the respective reactions:

$$SO_3 + Ca(OH_2) = CaSO_4 + H_2O$$

$$So_3 + Na_2CO_3 = Na_2SO_4 + H_2O + CO_2$$

It is now apparent that by reacting certain acidic or acid-forming constituents with basic reactants conveyed in an atomized water slurry, a water-insoluble precipitate can be formed. Still further advantages, however, inhere in the present method. In particular, it has been found that some of the particulate products formed are not necessarily hard and dry, particularly at the temperatures encountered within the drying vessel. It has been found, however, that the dried, unreacted particles from the slurry will adhere to, and in effect encapsulate, the sticky reaction products so that the resulting particles may be treated like dry precipitate.

The relatively dry flue gas containing the reaction product particles is conducted through an appropriate duct 24 to a separator 22. As set forth above, separator 22 need not be of any particular construction, but may be selected from one of the various dry separator mechanisms on the market. In a preferred embodiment separator 22 comprises a cyclone, which centrifugally precipitates the dried material from the flue gases. The separated dry material falls into a hopper 40 from which it is transferred to bags or other containers 42.

As is recognized by those skilled in the art, most commercial cyclones are not effective to remove extremely small, fine dust particles, and accordingly it is believed desirable to provide a second separator 26 for removing fine particles, herein defined as particles less than 10 microns in size. In accordance with usual practices, it is anticipated that cyclone 22 is effective to remove particles of larger than 10 micron size. The second separator 26 is represented as a bag house or cloth filter, which is also a well-known, widely used available type of mechanical separator. Alternatively, an electrostatic precipitator may be used, it being recognized that the specific type of separator is not critical and can be selected to suit a given application. As with cyclone 22, filtered particulate matter is collected in a hopper 44 and ultimately disposed in receptacles 46.

Particles removed from the flue gases by the first and second separators can alternatively be transported to remote bagging or storage areas. The cleaned flue gases exiting from the separators are blown into outlet stack 28 by a fan 48 and subsequently allowed to escape into the atmosphere.

It will now be appreciated that there has been described an improved method of removing vaporous or gaseous contaminants from a flue gas, which avoids many of the drawbacks of deficiencies of prior art wet scrubbing systems. Not only is the separated reaction product dry and easy to transport and handle, but in addition the relatively dry, acid-free flue gas and particulate matter which exits from the reaction zone will not attack or corrode the ducting or other apparatus which it encounters.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

We claim:

1. A method for removing gaseous or vaporous impurities from a stream of hot flue gas, comprising the steps of:

directing a stream of hot flue gas containing gaseous or vaporous impurities into the upper end of a vessel having an outlet at its lower end;

preparing a water solution or slurry liquor of a reagent selected to be reactive with said impurities;

directing a stream of this liquor downwardly onto an atomizing disc located near the upper end of the vessel and spinning about a vertical axis, thus atomizing the liquor;

directing an annular stream of relatively cold ambient air downwardly around the region of atomization of the liquor, thus preventing the admixture of the liquor and flue gas and consequent drying of the liquor while in said region;

thereafter permitting the admixture of the liquor and the flue gas stream, thus entraining the liquor within the flue gas stream and thereby allowing the water in the liquor to evaporate and the reagent to react with the impurities, forming a downwardly minimally swirling stream of hot flue gas having dry discrete particles entrained therein;

removing this stream of hot flue gas having particles entrained therein via the outlet of the vessel; and separating the discrete particles from the flue gas stream.

2. The method according to claim 1 further including the step of maintaining a finite separation between the atomized liquor and the walls of said vessel.

3. The method according to claim 1, including providing a cyclone separator for separating said particles from said flue gas.

4. The method according to claim 3, wherein said cyclone separator serves to remove particles greater than 10 microns in diameter, further including the step of providing a second separator for removing particles smaller than 10 microns in size.

5. The method according to claim 4, wherein said second separator comprises an electrostatic precipitator.

6. The method according to claim 4, wherein said second separator comprises a filter stage.

* * * * *